UNITED STATES PATENT OFFICE.

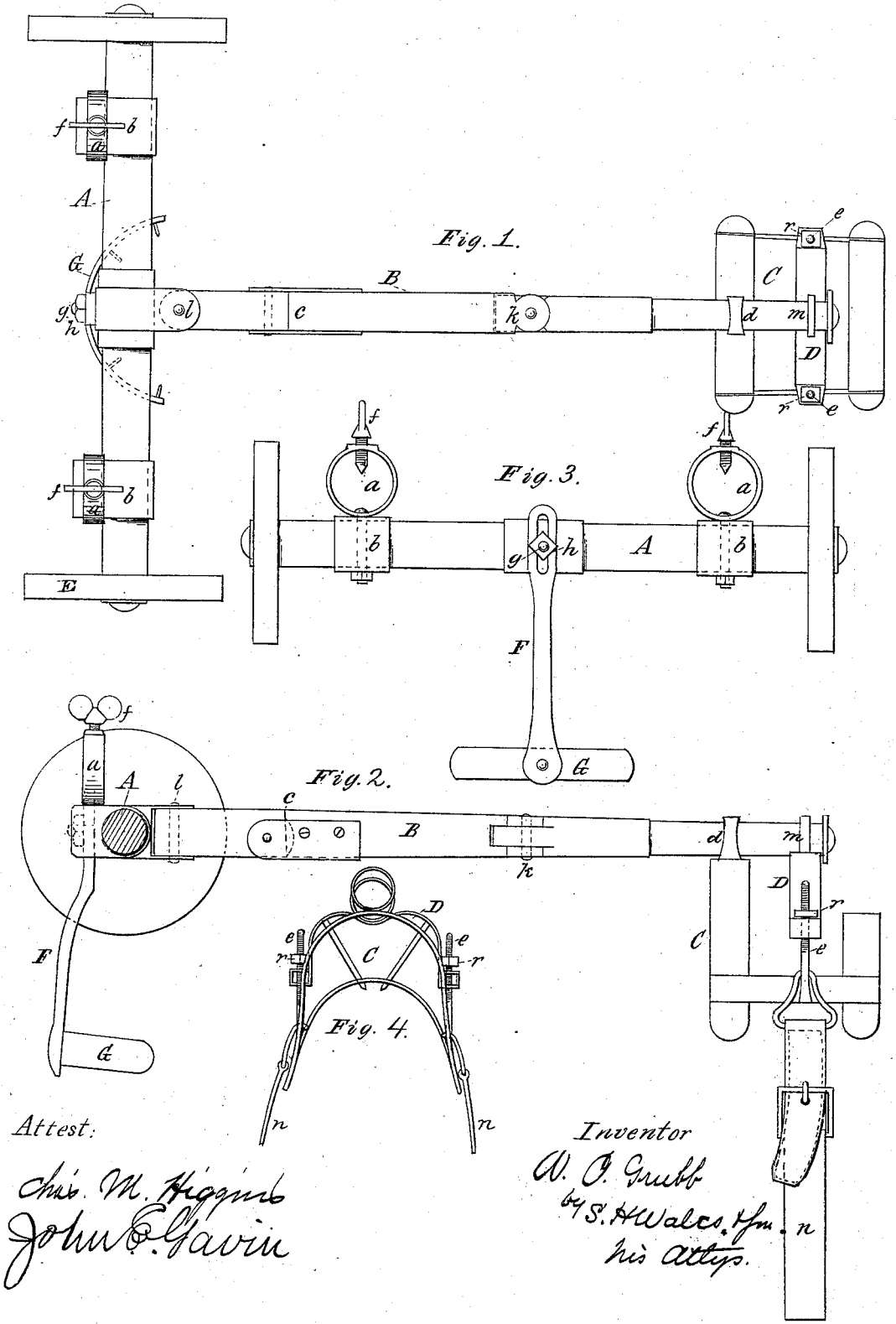

WILLIAM C. GRUBB, OF BIG SPRING, TENNESSEE, ASSIGNOR OF ONE-HALF HIS RIGHT TO JACOB L. GRUBB, OF SAME PLACE.

IMPROVEMENT IN ANIMAL-POKES.

Specification forming part of Letters Patent No. 217,367, dated July 8, 1879; application filed March 10, 1879.

*To all whom it may concern:*

Be it known that I, WILLIAM C. GRUBB, of Big Spring, Meigs county, State of Tennessee, have invented an Improvement in Animal-Pokes, of which the following is a specification.

The object of my invention is to provide a restraining device or harness for refractory or "breachy" cattle, which, while permitting all their necessary movements, will prevent their injuring other cattle by goring or by throwing with the nose, and also prevent their leaping over fences, &c.

Figure 1 of the annexed drawings presents a plan view of my invention; Fig. 2, a side elevation, and Fig. 3 a front elevation thereof. Fig. 4 is an end view of the saddle portion detached.

In the drawings, A represents a cross-bar, which is attached to the head of the animal, and B is a jointed rod extending centrally therefrom to lie over the animal's back, and terminating in a saddle, C, which is fastened over the animal's back by the girt-strap $n$.

The head-bar A is fitted with the rings $a\ a$, in which the tips of the horns are received, and there securely held by the thumb-screws $f\ f$, which are partly screwed into the horns, thus firmly holding the bar A on the head of the animal. These rings $a\ a$ project from the blocks $b\ b$, which encircle the rod A, and which have a free adjustment outward and inward, as well as radially, on the bar, while the rings $a\ a$ are swiveled on the blocks, as shown, thus, as will be observed, providing a universal adjustment of the horn-rings, which enables the apparatus to be properly fitted to the horns of any animal. Each end of the bar A is fitted with a wheel or roller, E, about one foot in diameter, which will prevent the animal using his head or horns injuriously, causing the head to roll away from the point which it may attempt to attack.

From the center of the rod A, on its front side, a rod, F, hangs down between the animal's eyes, and terminates in a spiked curve, G, which rests on the nose, thus preventing the nose being used for any mischief. The nose-rod is secured to the head-bar by the bolt and nut $g\ h$, and the attached end of the nose-rod is slotted, as shown, to allow of its adjustment to any animal, as will be understood.

The back-rod B, with the saddle C, is designed to prevent the animal leaping over fences, or making other movements where it is necessary that the head be raised. This bar B has a lateral joint at $k$, which permits the rod to freely bend sidewise to permit the necessary sidewise movements of the head and neck, and it has also another joint near the head-bar at $c$, which is a knuckle-joint, that permits the rod to bend downward to allow the head to be lowered for grazing or drinking, or other necessary actions, but prevents the head and neck being thrown up beyond a normal position, this back-rod being thus practically rigid in an upward direction. The back-rod is also laterally jointed at its connection with the head-bar on the bolt $l$, which may be removed to detach the back-rod and saddle when it is not required to use them in connection with the head-bar.

Now, the saddle $c$ is fitted with two upright rods, $e\ e$, which guide a spiked slide, D, whose upward motion is limited by the nuts $r\ r$, and the spikes of which project toward the animal's back, as shown.

The rear end of the back-rod passes through an eye, $d$, on the saddle, and its extremity is engaged with an eye, $m$, on the spiked slide D.

It will now be seen that when the animal's head is raised in attempting to leap or rear, the rod B will remain rigid and will rock on the eye of the saddle as on a fulcrum, thus depressing its lower end, forcing down the slide D, and causing the spikes to prick the animal's back, thus throwing the animal out of spring for the leap, and putting a discouraging restraint upon his ardor.

It will thus be observed that while this device freely allows all the necessary motions of the animals, it yet effectually restrains them from any violence, preventing them from leaping over fences, rearing upon the cattle, throwing with the nose, or goring, and it will also prevent a cow from sucking herself.

The apparatus is constructed mainly of metal, the wheels E being preferably of hard wood, and although I prefer the exact construction shown, yet the details may be somewhat varied without departing from the scope of the invention.

What I claim as my invention is—

1. A restraining device for cattle, formed of a bar adapted to be secured to the horns, and fitted at each end with wheels or rollers extending beyond the horns, substantially as herein set forth.

2. The combination of the head-bar A, the adjustable horn-rings $a\ a$, and the deflecting-rollers E E, substantially as shown and described.

3. A device for restraining cattle, formed of a transverse bar adapted to be secured to the head, with a longitudinal bar adapted to extend along the animal's back, and jointed or articulated both vertically and laterally to permit downward and sidewise movements of the neck and head, while it is rigid to upward movements thereof, together with a saddle fitted to the animal's back, and providing a fulcrum-point for the said bar, and with a prodding device, which is depressed against the animal's back by the action of the said bar on the raising of the animal's head, substantially as shown and described.

WILLIAM C. GRUBB.

Witnesses:
N. P. McNABB,
E. A. WAMACK.